United States Patent [19]
Tanahashi

[11] Patent Number: 5,992,833
[45] Date of Patent: Nov. 30, 1999

[54] FLUID-FILLED VIBRATION DAMPING DEVICE HAVING PNEUMATICALLY OSCILLATED MEMBER PARTIALLY DEFINING FLUID CHAMBER

[75] Inventor: Hiroaki Tanahashi, Aichi, Japan

[73] Assignee: Tokai Rubber Industries, Ltd., Japan

[21] Appl. No.: 09/046,295

[22] Filed: Mar. 23, 1998

[51] Int. Cl.$^6$ ............................................. F16F 5/00
[52] U.S. Cl. ............................. 267/140.14; 267/140.13
[58] Field of Search ........................ 267/140.11, 140.13, 267/140.14, 140.15

[56] References Cited

U.S. PATENT DOCUMENTS

| | | | |
|---|---|---|---|
| 4,657,232 | 4/1987 | West ................................... | 267/140.13 |
| 5,042,786 | 8/1991 | Freudenberg et al. ............. | 267/140.14 |
| 5,170,998 | 12/1992 | Muramatsu .......................... | 267/527 |
| 5,217,211 | 6/1993 | Ide et al. ............................. | 267/140.13 |
| 5,246,212 | 9/1993 | Funahashi et al. ................. | 267/140.13 |
| 5,277,409 | 1/1994 | Goto et al. .......................... | 267/140.14 |

FOREIGN PATENT DOCUMENTS 61-191543  11/1986  Japan .
6294438  10/1994  Japan .

*Primary Examiner*—Robert J. Oberleitner
*Assistant Examiner*—Mariano Sy
*Attorney, Agent, or Firm*—Wall Marjama Bilinski & Burr

[57] ABSTRACT

A fluid-filled vibration damping device having an elastic body connecting two mutually spaced-apart mounting members, a fluid chamber filled with a non-compressible fluid, and a movable member which partially defines the fluid chamber and which is oscillated to control a pressure of the fluid in the fluid chamber, for regulating damping characteristics of the device. The movable member partially defines a working air-chamber on one of opposite sides thereof which is remote form the fluid chamber, and is oscillated by a periodic change of an air pressure which is applied to the working air-chamber. A restoring member is disposed on at least one of opposite sides of the movable member for elastically supporting the movable member, so that an elastic force of the restoring member acts on the movable member to restore the movable member to an original position thereof during oscillation thereof.

10 Claims, 2 Drawing Sheets

FLUID-FILLED VIBRATION DAMPING DEVICE HAVING PNEUMATICALLY OSCILLATED MEMBER PARTIALLY DEFINING FLUID CHAMBER

The present application is based on Japanese Patent Application No. 9-71573 filed on Mar. 25, 1997, the content of which is incorporated hereinto by reference.

BACKGROUND OF THE INVENTION

1. Field of the Invention

The present invention relates to a fluid-filled vibration damping device which has a fluid chamber or chambers filled with a non-compressible fluid and which is capable of exhibiting a high damping effect with respect to input vibrations, by controlling the pressure of the fluid within the fluid chamber or chambers and thereby positively utilizing flows of the fluid and a change of the pressure of the fluid.

2. Discussion of the Related Art

As one type of a vibration damper interposed between two members of a vibration system so as to flexibly connect these two members or mount one of these members on the other member in a vibration damping manner, there is known a fluid-filled vibration damping device as disclosed in JP-A-6-294438 (laid-open publication of Japanese Patent Application). Such a fluid-filled vibration damping device includes: a first and a second mounting member which are spaced apart from each other; an elastic body elastically connecting the first and second mounting members; and a movable member which partially defines a primary fluid chamber filled with a non-compressible fluid the pressure of which changes as a result of an elastic deformation of the elastic body upon application of a vibrational load between the first and second mounting members. The movable member is oscillated at a frequency corresponding to a frequency of the input vibrations to be damped by the vibration damping device, whereby the pressure of the fluid in the primary fluid chamber is controlled so as to suitably regulate vibration damping characteristics of the vibration damping device.

As another type of the vibration damper, there is proposed a fluid-filled vibration damping device as disclosed in JP-U-61-191543 (laid-open publication of Japanese Utility Model Application). This type of fluid-filled vibration damping device includes: a first and a second mounting member which are spaced apart from each other; an elastic body elastically connecting the first and second mounting members and partially defining a primary fluid chamber filled with a non-compressible fluid the pressure of which changes upon application of a vibrational load between the first and second mounting members; a movable member which partially defines an auxiliary fluid chamber filled with the non-compressible fluid and which is oscillated to cause a periodic change of a pressure of the fluid in the auxiliary fluid chamber; and means for defining an orifice for fluid communication between the primary and auxiliary fluid chambers. In this type of vibration damping device, the pressure in the auxiliary fluid chamber by the oscillation of the movable member is controlled based on the pressure change which is induced in the primary fluid chamber as a result of elastic deformation of the elastic body upon application of the vibrational load. With the pressure in the auxiliary fluid chamber being controlled, vibration damping characteristics of the vibration damping device can be suitably regulated, based on the flows of the fluid through the orifice or the resonance of the fluid flowing through the orifice, or based on the fluid pressure change which is induced in the primary fluid chamber due to transmission of the pressure change from the auxiliary fluid chamber through the orifice.

In the above-described fluid-filled vibration damping devices, electromagnetic drive means is usually employed for oscillating the movable member. For assuring a high damping effect by controlling the pressure of the fluid in the fluid chamber, it is necessary to oscillate the movable member at an amplitude and a frequency corresponding to those of the input vibrations. To this end, the electromagnetic drive means has to have a sufficiently large drive force for oscillating the movable member, inevitably resulting in an increased size of the electromagnetic drive means including a coil and a permanent magnet, and accordingly an increased size of the entire vibration damping device. That is, the known vibration damping device tends to suffer from difficulty to exhibit a satisfactory damping performance with a required small size thereof.

Further, for assuring a sufficient degree of stability of the electromagnetic force generated by the electromagnetic drive means, the coil, permanent magnet and other components must be built in the damping device with high positional and dimensional accuracy, requiring a high level of skill for the manufacture, complicating the fabrication of the damping device, and accordingly reducing the efficiency of the manufacture of the damping device in a large scale.

Further, the known fluid-filled vibration damping device suffers from other problems such as a temperature rise due to heat generated by energization of the coil, and a relatively large amount of electric power consumption, where the oscillation of the movable member is required to be effected continuously for a long time or with a large drive force, depending upon the specific operating condition or required operating characteristics of the damping device.

SUMMARY OF THE INVENTION

It is therefore a first object of this invention to provide a relatively small-sized, light-weight fluid-filled vibration damping device which is simple in construction with a relatively small number of components, and which incorporates a novel mechanism suitable for oscillating the movable member so as to effectively control the fluid pressure within the fluid chamber.

It is a second object of this invention to provide a fluid-filled vibration damping device capable of controlling the fluid pressure in the fluid chamber continuously for a long time by oscillation of the movable member, with improved stability, without the conventionally encountered problems such as heat generation and requirement for large electric power consumption by the oscillating mechanism for the movable member.

The above objects may be achieved according to the principle of the present invention, which provides a fluid-filled vibration damping device comprising: (a) a first and a second mounting member which are spaced apart from each other, (b) an elastic body elastically connecting the first and second mounting members, (c) a fluid chamber which is filled with a non-compressible fluid, and (d) a movable member which partially defines the fluid chamber and which is oscillated to control a pressure of the fluid in the fluid chamber, for regulating damping characteristics of the vibration damping device, the fluid-filled vibration damping device being characterized in that the movable member partially defines a working air-chamber on one of opposite sides thereof which is remote form the fluid chamber, the movable member being oscillated by a periodic change of an air pressure which is applied from an external air pressure source to the working air-chamber, and that a restoring member is disposed on at least one of opposite sides of the movable member for elastically supporting the movable member, so that a force based on an elasticity of the restoring member acts on the movable member to restore the movable member to an original position thereof during oscillation thereof.

In the fluid-filled vibration damping device constructed according to the present invention as described above, the force based on the elasticity of the restoring member permits the movable member to be restored or returned to its original position, when the air pressure in the working air-chamber is changed after the movable member has been moved or displaced from the original position. Thus, the provision of the restoring member on at least one of the opposite sides of the movable member permits the oscillation of the movable member, by periodically changing the air pressure in the working air-chamber between two different negative values or between two different positive values, or alternatively between the atmospheric pressure and a predetermined negative or positive value. The periodic change of the air pressure in the working air-chamber is transferred to the fluid chamber through the oscillation of the movable member, so that the fluid pressure in the fluid chamber can be controlled by controlling the air pressure in the working air-chamber, and thereby enabling the damping device to exhibit a high vibration damping effect on the basis of the flows of the fluid and the fluid pressure in the fluid chamber. It is noted that the restoring member is disposed on at least one of the opposite sides of the movable member, such that the restoring member and the movable member are spaced apart from each other by a suitable distance which allows the restoring member and the movable member to be elastically deformed.

The present fluid-filled vibration damping device does not incorporate or require any actuator such as an electromagnetic drive device for oscillating the movable member, but is capable of controlling the fluid pressure within the fluid chamber. Accordingly, the present damping device is simple and compact in construction with a reduced number of components and a reduced weight, and is therefore comparatively easy and economical to manufacture.

Further, in the present fluid-filled vibration damping device, the fluid pressure within the fluid chamber can be suitably changed by utilizing the external air pressure source. The use of the air pressure from the external air pressure source permits a continuous operation of the damping device so as to exhibit a desired vibration damping effect with high stability, without the conventionally experienced drawbacks such as a temperature rise of the device due to heat generated by the electromagnetic drive means and a relatively large amount of consumption of electric power.

Still further, in the present fluid-filled vibration damping device, the force owing to the elasticity of the restoring member acts on the movable member so as to easily restore the displaced movable member to its original position. The presence of the restoring member facilitates the movable member to be oscillated, and accordingly permits the fluid pressure within the fluid chamber to be controlled over a wider range, so that the fluid-filled vibration damping device advantageously exhibits an improved damping performance on the basis of the fluid pressure in the fluid chamber.

According to a first preferred form of the present invention, the movable member includes an elastic plate, and the movable member and the restoring member are supported at respective outer peripheral portions thereof by the second mounting member and fixedly connected at respective central portions thereof with each other.

In the fluid-filled vibration damping device according to the first preferred form of the invention, the elastic plate of the movable member generates an elastic force for restoring the movable member to its original position during the oscillation of the movable member, thereby improving the response of the fluid pressure in the fluid chamber, leading to an accordingly improved vibration damping effect on the basis of the fluid pressure in the fluid chamber. Further, since the movable member and the restoring member are connected with each other at their respective central portions, the elasticity of the movable member effectively cooperates with the elasticity of the restoring member to provide the entire force for restoring the movable member to its position, leading to a further improved vibration damping effect on the basis of the fluid pressure in the fluid chamber.

According to a second preferred form of the present invention, the restoring member is disposed on one of the opposite sides of the movable member which is remote from the working air-chamber, and the restoring member has at least one void or opening formed therethrough, through which the non-compressible fluid is allowed to flow during the oscillation of the movable member.

In the fluid-filled vibration damping device according to the second preferred form of the invention, the fluid is allowed to flow through the opening in the restoring member, upon application of the vibrational load to the vibration damping device. By suitably selecting the size of the opening, it is possible to positively utilize the resonance of the fluid flowing through the opening, thereby further improving the vibration damping performance of the vibration damping device.

According to a third preferred form of the invention, the restoring member has at least one generally spiral slit formed therethrough, so as to extend between radially radially inner and outer portions of the restoring member.

In the fluid-filled vibration damping device according to the third preferred form of the invention, the force for restoring the movable member to its original position can be easily adjusted as desired, while assuring a high durability of the restoring member, by suitably tuning the size of each generally spiral slit and/or the number of the at least one slit. In other words, a selected one of the restoring members having different sizes and/or numbers of the spiral slits makes it possible to adjust the vibration damping characteristics of the damping device, advantageously leading to a high degree of freedom of adjustment of the damping characteristics with ease. Further, in a fluid-filled vibration damping device having the both features of the preferred second and third forms of the invention, the generally spiral slit or slits as the at least one opening formed through the restoring member is/are effective to provide a high degree of freedom of adjustment of the damping characteristics based on the fluid flowing through the opening or openings, while assuring high durability of the restoring member and a sufficiently large force provided by the restoring member for restoring the movable member.

According to a fourth preferred form of the present invention, the fluid chamber includes a primary fluid chamber which is partially defined by the elastic body and the movable member, a pressure of the non-compressible fluid in the primary fluid chamber changing as a result of elastic deformation of the elastic body upon application of a vibrational load between the first and second mounting members.

In the fluid-filled vibration damping device according to the fourth preferred form of the present invention, the periodic change of the air pressure in the working air-chamber is transferred to the primary fluid chamber through the oscillation of the movable member, so that the fluid pressure in the primary fluid chamber can be controlled directly by controlling the air pressure in the working air-chamber, thereby suitably controlling the damping characteristics of the damping device. In a vibration damping device having the both features of the second and fourth preferred forms of the present invention, the fluid is permitted to flow through the at least one opening formed through the restoring member as a result of the oscillation of the movable member, so that the vibration damping device exhibits a high vibration damping effect on the basis of the fluid flowing through the opening or openings, without the provision of an exclusive member for defining the opening or openings.

According to a fifth preferred form of the present invention, the fluid chamber includes a primary and an auxiliary fluid chamber. The primary fluid chamber is partially defined by the elastic body while the auxiliary fluid chamber is partially defined by the movable member, the primary and auxiliary fluid chambers communicating with each other through an orifice. In the damping device, a pressure of the non-compressible fluid in the primary fluid chamber changes as a result of elastic deformation of the elastic body upon application of a vibrational load between the first and second mounting members.

In the fluid-filled vibration damping device according to the fifth preferred form of the present invention, the periodic change of the air pressure in the working air-chamber is transferred to the auxiliary fluid chamber through the oscillation of the movable member. Therefore, it is possible to advantageously control the vibration damping characteristics of the damping device on the basis of the fluid flowing through the orifice and the fluid pressure in the primary fluid chamber, by suitably adjusting a phase of the pressure change in the fluid in the auxiliary fluid chamber, more specifically, by determining an oscillation phase of the movable member depending upon a phase of the pressure change in the fluid in the primary fluid chamber, which pressure change is induced by the vibrational load applied to the damping device, such that there exists a suitable phase difference between the oscillation of the movable member and the frequency of vibrational load.

According to a sixth preferred form of the present invention, the restoring member consists of a plate spring. In the fluid-filled vibration damping device according to the sixth preferred form of the invention, the use of the plate spring as the restoring member is effective to minimize the overall size of the damping device while assuring a sufficiently large force for restoring the movable member to its original position. It is noted that a known plate spring made of a metallic material is preferably employed to serve as the above-described plate spring, and its shape and material may be suitably selected. Regarding the shape of the plate spring, for instance, the plate spring may have a flat-plate shape, or alternatively a conical shape.

According to a seventh preferred form of the invention, the pressure source includes a vacuum pressure source. In the fluid-filled vibration damping device according to the seventh preferred form of the invention, the fluid pressure within the fluid chamber is changed by utilizing the vacuum pressure source. Where the present damping device is used for a motor vehicle having an internal combustion engine, the vacuum pressure for the damping device is readily available from the engine, and a vacuum pressure source exclusively used for the damping device is not necessary.

According to an eighth preferred form of the present invention, the fluid-filled vibration damping device further includes a pressure control device connected to the working air-chamber, for changing the air pressure in the working air-chamber in synchronization with a frequency of a vibrational load to be damped by the vibration damping device.

In the fluid-filled vibration damping device according to the eighth preferred form of the invention, the fluid pressure in the fluid chamber can be controlled depending upon the frequency of the vibrational load applied to the damping device, so that the damping device exhibits a high vibration damping effect on the basis of the flows of the fluid and the fluid pressure in the fluid chamber.

According to one advantageous arrangement of the eighth preferred form of the invention, the pressure control device includes a switch valve for selectively connecting the working air-chamber to the air pressure source and an atmosphere.

In the fluid-filled vibration damping device according to the one advantageous arrangement of the eighth preferred form of the invention, the provision of the switch valve to the pressure control device is effective to easily change the air pressure in the working air-chamber in synchronization with the frequency of the input vibration. For facilitating the control of the switch valve at a relatively high frequency, the switch valve is desirably a solenoid-operated switch valve, which may be controlled in a known adaptive control fashion or according to a stored data map, on the basis of an output signal of a vibration sensor such as an acceleration sensor.

BRIEF DESCRIPTION OF THE DRAWINGS

The above and optional objects, features, advantages and technical or industrial significance of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
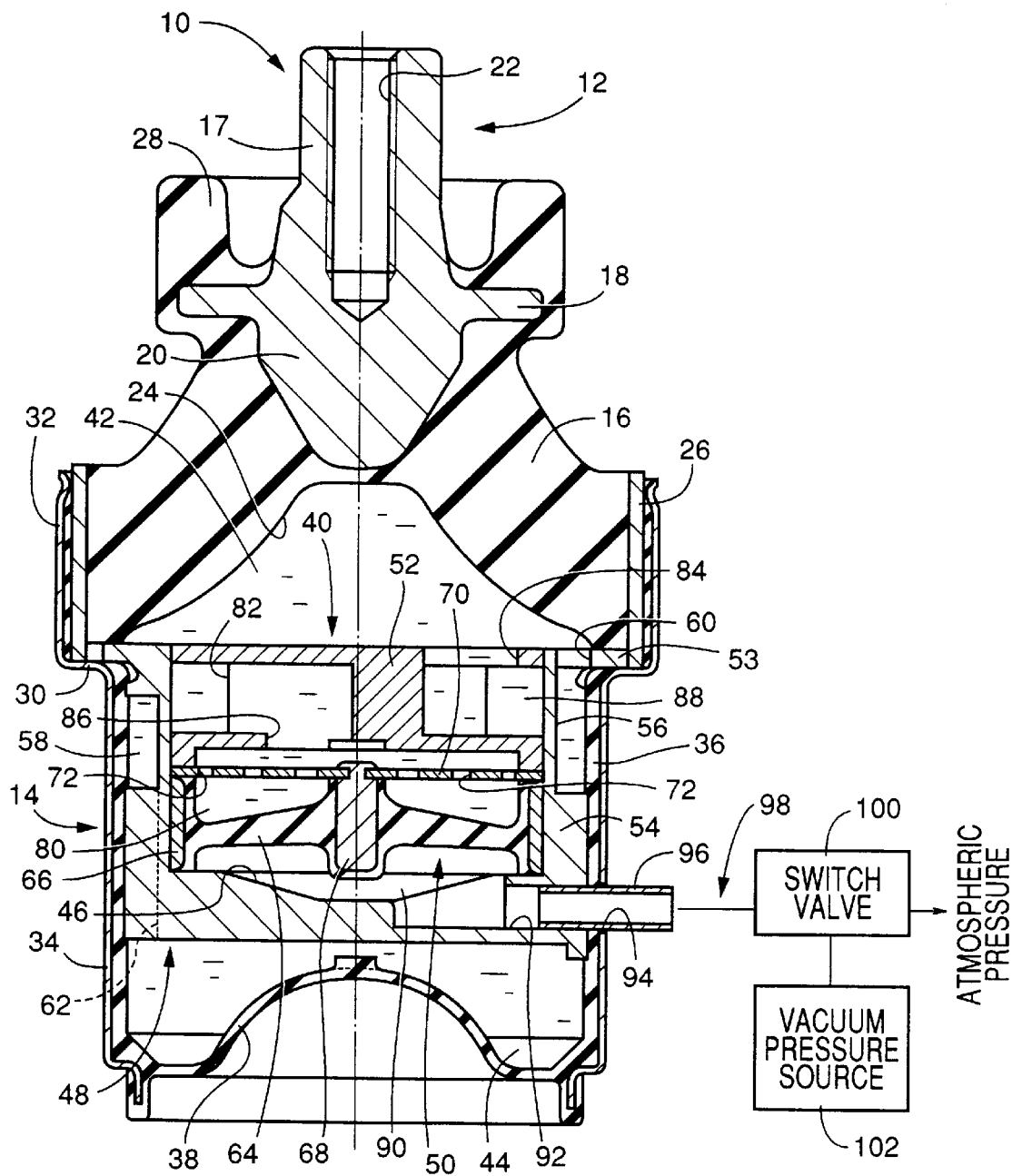
FIG. 1 is an elevational view in axial or vertical cross section of a fluid-filled vibration damping device in the form of an engine mount constructed according to one embodiment of this invention.

Referring first to FIG. 1, there is shown an engine mount 10 for a motor vehicle, as one embodiment of the fluid-filled vibration damping device of the present invention. This engine mount 10 includes a first mounting member 12 and a second mounting member 14 which are both made of metallic materials and which are disposed in mutually opposed and spaced-apart relationship with each other. These first and second mounting members 12, 14 are elastically connected to each other by an elastic body 16 which is made of a rubber material. The first and second mounting members 12, 14 are attached to a power unit and a body of the motor vehicle, respectively, so that the power unit which includes an engine is mounted on the vehicle body in a vibration damping fashion. With this engine mount 10 installed on the vehicle as described above, the elastic body 16 is held elastically compressed with the weight of the power unit acting on the engine mount 10. The engine mount 10 is installed so as to damp input vibrations which are applied in a direction in which the two mounting members 12, 14 are opposed to each other, namely, in the vertical direction as seen in FIG. 1 or in a direction substantially parallel to the vertical direction.

Described more specifically, the first mounting member 12 as a whole is a substantially cylindrical solid member, and includes an internally threaded mounting portion 17, a stopper portion 18 and an inverted frusto-conical portion 20, which are formed integrally with each other. The stopper portion 18 extends radially outwardly from an axially intermediate portion of the outer circumferential surface of the first mounting member 12. The internally threaded mounting portion 17 extends axially upwardly from the above-described axially intermediate portion, and has a tapped hole 22 which axially extends so as to be open in the upper end face of the threaded mounting portion 17. The inverted frusto-conical portion 20 extends axially downwardly from the above-described axially intermediate portion, and has a diameter which decreases progressively as the inverted frusto-conical portion 20 extends in the downward direction. The first mounting member 12 is attached to the power unit (not shown in the figure) through a suitable bolt screwed into the tapped hole 22.

The first mounting member 12 is bonded to the elastic body 16 in the process of vulcanization of a rubber material for forming the elastic body 16. The elastic body 16 has a generally frusto-conical shape having a relatively large diameter. The elastic body 16 has a recess 24 open in its large-diameter end face. The first mounting member 12 and the elastic body 16 are bonded together such that the inverted frusto-conical portion 20 of the first mounting member 12 is embedded in the small-diameter portion of the elastic body 16. To the outer circumferential surface of the large-diameter end portion of the elastic body 16, there is bonded a cylindrical connecting metal member 26 in the above-indicated process of vulcanization.

On the stopper portion 18 of the first mounting member 12, there is formed an annular rubber cushion 28 integrally with the elastic body 16 such that the rubber cushion 28 extends in the axially upward direction of the elastic body 16. This rubber cushion 28 is provided for abutting contact with an abutting portion provided on the vehicle body, for limiting the distance of displacement of the power unit relative to the vehicle body.

The second mounting member 14 is a generally cylindrical member with a relatively large diameter including an axially intermediate shoulder portion 30, an axially upper large-diameter portion 32 located on the upper side of the shoulder portion 30, and an axially lower small-diameter portion 34 located on the lower side of the shoulder portion 30. The second mounting member 14 is attached to the body of the motor vehicle through a suitable bracket (not shown in the figure). The inner circumferential surfaces of the large-diameter and small-diameter portions 32, 34 are substantially entirely covered by a thin sealing rubber layer 36. The small-diameter portion 34 is fluid-tightly closed at its lower opening by an easily deformable diaphragm 38 which has a relatively small thickness and which is formed integrally with the sealing rubber layer 36.

The large-diameter portion 32 of the second mounting member 14 is fitted on the cylindrical connecting metal member 26. With the large-diameter portion 32 being radially inwardly drawn by suitable means such as drawing die, the large-diameter portion 32 is fluid-tightly fitted on the cylindrical connecting metal member 26. Thus, the first and second mounting member 12, 14 are elastically connected to each other through the elastic body 16, such that the elastic body 16 fluid-tightly closes the upper opening of the large-diameter portion 32, and cooperates with the second mounting member 14 and the flexible diaphragm 38 to define a fluid chamber which is filled with a suitable non-compressible fluid and which is located between the elastic body 16 and the flexible diaphragm 38 within the second mounting member 14. The non-compressible fluid filling the fluid chamber is preferably a low-viscosity fluid whose viscosity is 0.1 Pa•s or lower, such as water, alkylene glycol, polyalkylene glycol or silicone oil, so that the present engine mount 10 exhibits an excellent vibration damping effect on the basis of the resonance of the fluid.

The small-diameter portion 34 of the second mounting member 14 accommodates therein a partition member 40 which is a generally cylindrical structure. The partition member 40 is fixed in fluid-tight contact with the inner circumferential surface of the small-diameter portion 34, more precisely, with the inner circumferential surface of the sealing rubber layer 36. Thus, the partition member 40 divides the above-indicated fluid chamber within the second mounting member 14 into two sections, namely, an upper section partially defined by the elastic body 16 and a lower section partially defined by the flexible diaphragm 38. Described more specifically, the partition member 40 cooperates with the elastic body 16 to define a primary fluid chamber 42 on its upper side, and cooperates with the flexible diaphragm 38 and the second mounting member 14 to define an equilibrium fluid chamber 44 on its lower side. Upon application of a vibrational load between the first and second mounting members 12, 14, the pressure of the fluid within the primary fluid chamber 42 which is partially defined by the elastic body 16 changes due to elastic deformation of the elastic body 16. On the other hand, elastic deformation or displacement of the flexible diaphragm 38 permits easy change in the volume of the equilibrium fluid chamber 44.

The partition member 40 includes an outer wall member 48 which is a thick-walled generally cylindrical member having a central recess or hole 46 open in the axially upper end face. Namely, the generally cylindrical outer wall member 48 is open at its upper end and closed at its lower end. Within the central recess 46, there are accommodated a movable member 50 and a closure member 52 which is a thick-walled generally disk-like member. The movable member 50 is located at the bottom portion of the central recess 46, while the closure member 52 is fitted in the inner circumference of the upper portion of the central recess 46 so as to close the upper opening of the central recess 46. The outer wall member 48 has at its upper open end an integrally formed outward flange 53, which is gripped by and between the elastic body 16 and the shoulder portion 30 of the second mounting member 14, whereby the partition member 40 is fixed to the second mounting member 14.

The outer wall member 48 includes a circumferential wall portion 54 which has an outer groove 56 formed in its outer circumferential surface so as to extend over a predetermined distance in the circumferential direction. This outer groove 56 is closed by the inner circumferential surface of the small-diameter portion 34 of the second mounting member 14, whereby a restricted passage 58 is formed. Namely, the circumferential wall portion 54 having the outer groove 56 cooperates with the small-diameter portion 34 of the second mounting member 14 to define the restricted passage 58 which communicates at its opposite ends through communication holes 60, 62 with the primary fluid chamber 42 and the equilibrium fluid chamber 44, respectively. The restricted passage 58 permits the fluid flow between these two fluid chambers 42, 44 on the basis of a difference between the fluid pressure in the two fluid chambers 42, 44. In the present embodiment, the restricted passage 58 is tuned, that is, the length and cross section area of the restricted passage 58 are determined, so as to effectively damp the input vibrations having relatively low frequencies such as engine shakes, on the basis of the resonance of the fluid flowing through the restricted passage 58.

The movable member 50 accommodated in the partition member 40 consists of a generally disk-like elastic rubber plate 64 with an annular ring 66 bonded to its outer circumferential surface. The axial dimension or thickness of the rubber plate 64 decreases slightly as the movable member 50 extends radially outwardly. The annular ring 66 is fluid-tightly press-fitted in the central recess 46 of the outer wall member 48, such that the rubber plate 64 extends in the radial direction of the outer wall member 48. The rubber plate 64 is spaced apart from the bottom of the central recess 46 by a predetermined distance in the axial direction of the outer wall member 48, so as to cooperate with the bottom of the central recess 46 to define an interior space or a working air-chamber 90 which permits the rubber plate 64 to be elastically deformed. A connecting shaft 68, which extends in the axial direction of the outer wall member 48, is bonded by vulcanization to the rubber plate 64, such that the connecting shaft 68 is substantially embedded in the central portion of the rubber plate 64. The connecting shaft 68 serves to connect the rubber plate 64 to a plate spring 70 having a flat-plate shape. The plate spring 70 is superposed on the rubber plate 64 with a predetermined distance therebetween in the axial direction, such that the plate spring 70 faces the upper surface of the rubber plate 64. The plate spring 70 is gripped at its outer peripheral portion by and between the annular ring 66 and the closure member 52, whereby the plate spring 70 is supported, together with the rubber plate 64, by the second mounting member 14 through the partition member 40. The plate spring 70 has at its center a through-hole to which the upper end portion of the connecting shaft 68 is caulked, whereby the rubber plate 64 and the plate spring 70 are connected at their respective central portions with each other through the connecting shaft 68, so as to be moved or displaced together with each other.

Figure 2:
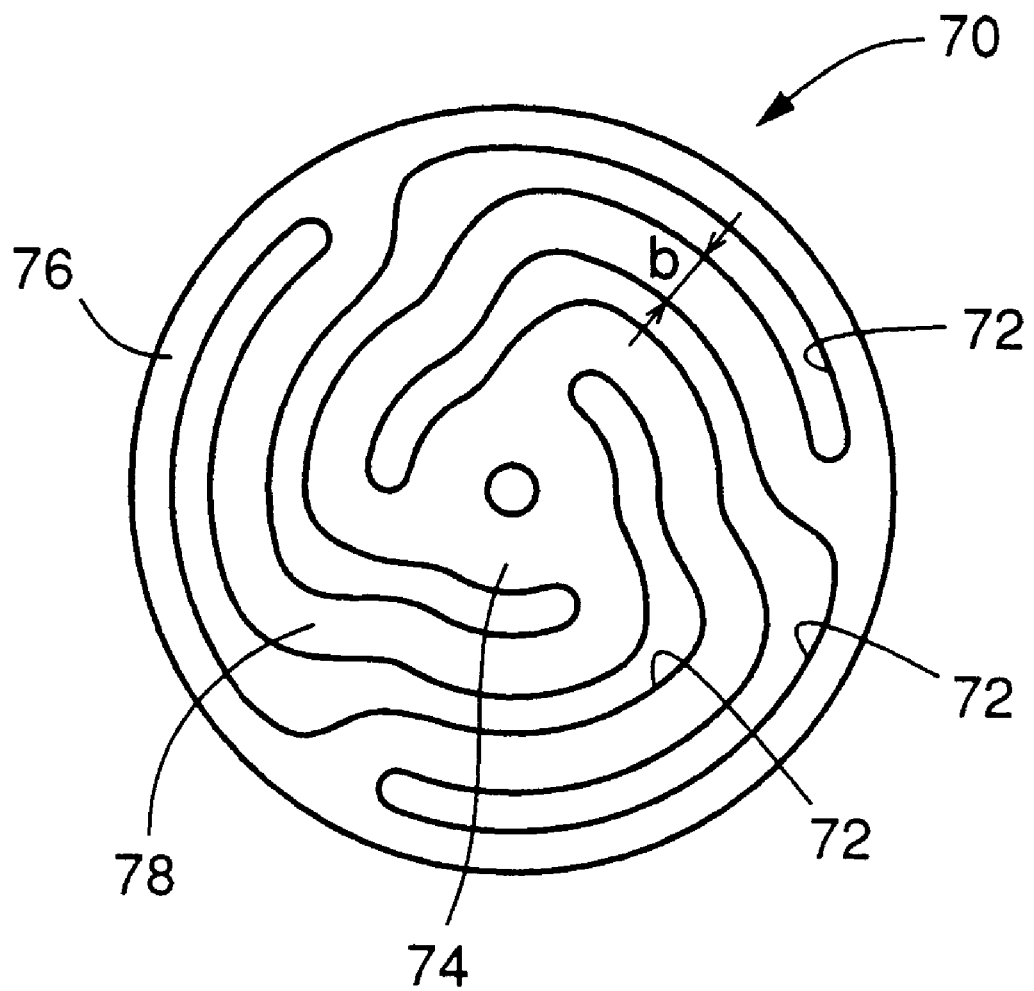
FIG. 2 is a plan view of a plate spring provided in the engine mount of FIG. 1.

As shown in FIG. 2, the plate spring 70 includes an elastic portion 78 which is constituted by a radially intermediate portion of the plate spring 70 which is formed between a radially inner annular portion 74 and a radially outer annular portion 76. The elastic portion 78 has three generally spiral slits 72 which are equally spaced apart from each other in the circumferential direction of the plate spring 70. Each of the spiral slits 72 is formed spirally so as to extend clockwise over a predetermined distance from the inner annular portion 74 towards the outer annular portion 76. The three spiral slits 72 divide the elastic portion 78 into three generally spiral strips each having a substantially constant width "b" as indicated in FIG. 2. Upon elastic deformation of the plate spring 70 which causes an axial displacement of the inner and outer annular portions 74, 76 relative to each other, the presence of the elastic portion 78 minimizes a stress developed in the plate spring 70, thereby advantageously improving the durability of the plate spring 70, while permitting a sufficiently large maximum amount of deformation of the plate spring 70.

The closure member 52 fluid-tightly closes the upper opening of the central recess 46 in which the plate spring 70 and the movable member 50 (which is constituted by the rubber plate 64) are accommodated and arranged in the axial direction of the outer wall member 48, so that the closure member 52 cooperates with the rubber plate 64 of the movable member 50 to define therebetween an auxiliary fluid chamber 80 which is filled with the same non-compressible fluid as the fluid filling the primary and equilibrium fluid chambers 42, 44. Since the three slits 72 which are formed through the plate spring 70 located in the axially intermediate portion of the auxiliary fluid chamber 80 have a sufficiently large total area of opening, the fluid is allowed to flow freely through the slits 72 between two sections of the auxiliary fluid chamber 80 on the opposite sides of the plate spring 70. Namely, the above-indicated two sections can be considered to provide the single auxiliary fluid chamber 80. The closure member 52 has an outer groove 82 formed in its outer circumferential surface so as to extend in the circumferential direction. This outer groove 82 is closed by the inner circumferential surface of the circumferential wall portion 54 of the outer wall member 48, whereby an orifice 88 is formed. That is, the closure member 52 having the outer groove 82 cooperates with the outer wall member 48 to define the orifice 88 which communicates at its opposite ends through communication holes 84, 86 with the primary and auxiliary fluid chambers 42, 80, respectively. The orifice 88 permits the fluid flow between these two chambers 42, 80 on the basis of a difference between the fluid pressure in the two fluid chambers 42, 80. In the present embodiment, the orifice 88 is tuned, that is, the length and cross sectional area of the orifice 88 are determined, so as to effectively damp the input vibrations having relatively high frequencies, such as engine idling vibrations, on the basis of the resonance of the fluid flowing through the orifice 88.

The above-indicated working air chamber 90 defined by the rubber plate 64 and the bottom of the central recess 46 is located on the lower side of the rubber plate 64, which is remote from the auxiliary fluid chamber 80. The outer wall member 48 has at its bottom portion an air passage 92 formed therethrough. The air passage 92 extends radially inwardly from the outer circumferential surface of the outer wall member 48 so as to open in the bottom surface of the central recess 46. The air passage 92 opens to the atmosphere through a through-hole 94 which is formed through the cylindrical wall of the small-diameter portion 34 of the second mounting member 14. A tubular member 96 is press-fitted into the air passage 92 through the through-hole 94, such that the free or outer end portion of the tubular member 96 projects radially outwardly from the through-hole 94. When the engine mount 10 is installed on the vehicle, the tubular member 96 is connected at its outer end to an external air conduit 98, which in turn is connected to a switch valve 100. This switch valve 100 has a first position for connecting the air conduit 98 to the atmosphere, and a second position for connecting the air conduit 98 to a vacuum pressure source 102. Thus, the working air-chamber 90 is selectively connectable to the atmosphere and a reduced pressure in the vacuum pressure source 102, by switching operations of the switch valve 100 between the first and second positions. Described more specifically, the switch valve 100 is switched at a predetermined or controlled frequency to alternately apply the atmospheric pressure and the reduced pressure to the working air-chamber 90 through the air conduit 98 and the air passage 92, so as to induce a periodic change of the air pressure in the working air-chamber 90.

Described in detail, the movable member 50 keeps its original shape owing to the elastic force of the rubber plate 64 and the plate spring 70 when the working air-chamber 90 is connected to the atmosphere, that is, when the pressure in the working air-chamber 90 is equal to the atmospheric pressure. When the working air-chamber 90 is connected to the vacuum pressure source 102, or when the reduced pressure of the vacuum pressure source 102 is applied to the working air-chamber 90, the movable member 50 is deformed or displaced downwardly (in the direction towards the bottom of the working air-chamber 90 or central recess 46) by a vacuum force applied to the lower surface of the rubber plate 64, against the elastic force of the rubber plate 64 and the plate spring 70. When the pressure in the working air-chamber 90 is changed from the reduced pressure to the atmospheric pressure, the movable member 50 restores its original shape or is deformed or displaced upwardly (in the direction towards the auxiliary fluid chamber 80) by a restoring force based on the elasticity of the rubber plate 64 and the plate spring 70. Thus, the movable member 50 is periodically reciprocated or oscillated in the axial direction of the engine mount 10, with the switch valve 100 being switched between the first and second positions at a given frequency.

With the movable member 50 being thus oscillated, the fluid pressure in the auxiliary fluid chamber 80 is periodically changed, whereby a difference between the fluid pressures in the primary and auxiliary fluid chambers 42, 80 is positively induced. By inducing the periodic change of the fluid pressure in the auxiliary fluid chamber 80 by oscillating the movable member 50 at a frequency corresponding to the frequency of the input vibrations, the fluid flows of the fluid through the orifice 88 between the auxiliary and primary fluid chambers 80, 42 can be positively induced. In other words, the amount of flow of the fluid through the orifice 88 can be advantageously increased by the oscillation of the movable member 50, whereby the fluid pressure in the primary fluid pressure 42 is effectively controlled by utilizing the resonance of the fluid flows, enabling the present fluid-filled engine mount 10 to exhibit a desired vibration damping effect, in particular, with respect to high-frequency vibrations such as engine idling vibrations, on the basis of the resonance of the fluid flows and the controlled fluid pressure in the primary fluid chamber 42.

As is clear from the above description, the present engine mount 10 includes means for defining the primary and auxiliary fluid chambers 42, 80 and the equilibrium chamber 44 which are filled with the non-compressible fluid. The auxiliary fluid chamber 80 is partially defined by the movable member 50 which is constituted by the rubber plate 64. The level of the reduced pressure to be applied to the working air-chamber 90, and the oscillation phase of the movable member 50 are suitably determined depending upon a time of delay of the transmission of the fluid pressure change from the auxiliary fluid chamber 80 to the primary fluid chamber 42, such that there exists a suitable phase difference between the oscillation of the movable member 50 and the input vibration. The switch valve 100 may be controlled in a feedback fashion or by other adaptive control methods so as to minimize or zero the control error, or according to a predetermined control pattern represented by a data map stored in a memory of a controller.

The present engine mount 10 does not require an actuator such as electromagnetic drive means, and is accordingly simple and compact in construction with reduced weight and is comparatively easy and economical to manufacture. The simple construction results in improved operating reliability and durability, and comparatively easy maintenance or repair of the engine mount 10. In particular, the fluid pressure in the primary fluid chamber 42 can be controlled by utilizing the reduced air pressure, which is available on any motor vehicle having an internal combustion engine, that is, by utilizing the reduced pressure in the intake system of the engine serving as the vacuum pressure source 102. Thus, the present engine mount 10 does not require an exclusive energy source for oscillating the movable member 50. In addition, the present engine mount 10 does not suffer from heat generation and extremely large electric power consumption due to energization of electromagnetic drive means, even where the movable member 50 is oscillated continuously for a long time.

Further, in the engine mount 10 constructed as described above, the elastic force of the plate spring 70 located above the movable member 50 cooperates with the elastic force of the rubber plate 64 to provide a large force for restoring the movable member 50 to its original position. Even where the movable member 50 has been deformed or displaced by the application of a considerably reduced pressure to the working air-chamber 90, the elastic force of the plate spring 70 advantageously prevents the movable member 50 from being stuck onto the inner surface of the working air-chamber 90. Namely, the presence of the plate spring 70 is effective to stabilize the activation of the movable member 50, and accordingly assuring improved damping characteristics of the engine mount 10. Further, when the pressure in the working air-chamber 90 is changed from the reduced pressure to the atmospheric pressure, the movable member 50 is displaced upward or restored to its original position by the above-described large force, with an excellent response to the pressure change in the working air-chamber 90, causing the fluid pressure in the auxiliary fluid chamber 80 to be largely changed. Thus, the pressure change in the auxiliary and primary fluid chambers 80, 42 is effectively induced by a simple control of the reduced pressure applied into the working air-chamber 90, such as the switching operations of the switch valve 100, enabling the engine mount 10 to exhibit an excellent damping effect.

The present engine mount 10 enjoys another advantage that the overall size of the engine mount 10 can be minimized owing to the utilization of the plate spring 70 which serves to restore the movable member 50 to its original position, since the plate spring 70 does not require a large space for installation in the engine mount 10. Further, the plate spring 70 has the slits 72 each having a unique shape as shown in FIG. 2, thereby assuring high durability of the plate spring 70 while enabling the movable member 50 to be displaced or moved over a larger distance in the axial direction of the engine mount 10. Thus, the shape of the slit 72 is effective to provide a higher degree of freedom in tuning the oscillation movement of the movable member 50 and accordingly the damping characteristics of the engine mount 10.

As described above, in the present engine mount 10, the plate spring 70 is accommodated in the auxiliary fluid chamber 80, such that the interior space within the auxiliary fluid chamber 80 consists of the two section on the opposite sides of the plate spring 70, namely, a lower section partially defined by the movable member 50 and an upper section closer to the open end of the orifice 88. However, the fluid is allowed to flow through the slits 72 of the plate spring 70 between the above-described two sections. This arrangement makes it possible to induce a larger amount of change in the fluid pressure in the auxiliary fluid chamber 80, on the basis of the resonance of the fluid flowing through the slits 72, by suitably tuning the size of the slits 72. The increased amount of change in the fluid pressures in the auxiliary fluid chamber 80 makes it possible to increase the difference between the fluid pressures in the primary and auxiliary fluid chambers 42, 80, and accordingly increase the amount of the fluid flowing through the orifice 88, thereby further improving the damping effect on the basis of the flows of the fluid.

The present engine mount 10 is also adapted such that the fluid is forced to flow through the restricted passage 58 between the primary and equilibrium fluid chambers 42, 44, due to a fluid pressure difference between these chambers 42, 44, which difference is induced upon application of the vibrational load to the engine mount 10. Accordingly, the engine mount 10 exhibits an excellent damping effect based on the resonance of the fluid flowing through the restricted passage 58, with respect to the input vibration whose frequency band is different from that of the input vibration that can be effectively damped based on the resonance of the fluid flowing through the orifice 88 between the primary and auxiliary fluid chambers 42, 80. Thus, the present engine mount 10 is capable of effectively damping the input vibrations over a relatively wide range of frequency.

For improving the damping effect based on the resonance of the fluid flowing through the restricted passage 58, it is effective and desirable to increase the amount of flow of the fluid through the restricted passage 58, by holding the movable member 50 stationary in a predetermined position with a predetermined air pressure, for example, a reduced pressure or the atmospheric pressure applied to the working air-chamber 90, or by oscillating the movable member 50 with the oscillation phase that maximizes the fluid pressure difference between the primary and equilibrium fluid chambers 42, 44. However, the equilibrium chamber 44 and the restricted passage 58 are not essential, and are provided depending upon the desired vibration damping characteristics. Further, the primary and equilibrium fluid chambers 42, 44 may be communicated with each other by a plurality of restricted passages which are tuned to respective different frequency bands of the input vibrations.

While the preferred embodiment of the present invention have been described above for illustrative purpose only, it is to be understood that the invention is not limited to the details of the illustrated embodiment.

For example, the orifice may be suitably tuned depending upon required damping characteristics of the engine mount. Specifically described, the restricted passage 58 may be tuned to effectively damp high-frequency vibrations such as engine idling vibrations, and the orifice 88 may be tuned to effectively damp still higher-frequency vibrations such as booming noise.

In the illustrated embodiment, the switch valve 100 is employed for selectively connecting the working air-chamber 90 to the air pressure source and the atmosphere. However, the switch valve 100 may be replaced by a suitable pressure control valve for alternately applying two different values of negative pressure or two different values of positive pressure to the working air chamber 90.

In the above-described embodiment, the primary fluid chamber is partially defined by the rubber-made elastic body 16, so that the pressure of the fluid in the primary fluid chamber changes as a result of deformation of the elastic body upon application of the vibrational load. However, the primary fluid chamber may be partially defined by a movable member, so that the pressure change is induced in the primary fluid chamber by the oscillation of the movable member. Specifically described, the provision of the closure member 52 is not essential, and the closure member 52 may be saved so that the primary fluid chamber 42 is partially defined by the movable member 50 as well as by the elastic body 16. In this case, the upper surface of the movable member 50 is exposed to the primary fluid chamber 42, whereby the oscillation of the movable member 50 directly induces the pressure change in the primary fluid chamber 42.

Where the primary fluid chamber 42 is partially defined by the movable member 50 as described above, the slits 72 formed through the plate spring 70 can serve as an orifice through which the fluid is allowed to flow, by suitably selecting the size or area of opening of the slits 72. In this case, an exclusive member is not required to provide the orifice, and two sections on the opposite sides of the plate spring 70 can serve as primary and auxiliary fluid chambers, respectively, which communicate with each other through the slits 72, so that an excellent damping effect is obtained based upon the pressure change in the primary fluid chamber induced by the oscillation of the movable member 50, and the resonance of the fluid flowing through the slits 72.

Further, the specific shape and construction of the plate spring 70 are not limited to the details in the illustrated embodiment, but may be suitably determined depending upon a desired damping performance of the engine mount and a required degree of durability of the plate spring. While the plate spring 70 in the illustrated embodiment has a flat-plate shape, the plate spring 70 may have a conical shape or any other suitable shape. Further, while the plate spring 70 is disposed on one of the opposite sides of the movable member 50 which is remote from the working air-chamber 90 in the illustrated embodiment, the plate spring 70 may be disposed on the other side of the movable member 50 which is remote from the fluid chamber.

While the preferred embodiment of the fluid filled vibration damping device in which the first and second mounting members are opposed to each other in the axial direction has been described by way of example. The principle of this invention is equally applicable to other fluid-filled vibration damping devices, such as a cylindrical fluid-filled vibration damping device which includes a first mounting member in the form of an inner sleeve, a second mounting member in the form of an outer sleeve that is spaced apart from the inner sleeve by a suitable distance in the radial direction, and an elastic body interposed between the inner and outer sleeves in the radial direction. This cylindrical damping device is preferably employed as an engine mount, a differential mount or a suspension bushing, for front-engine front-drive motor vehicles, for example.

Moreover, while the fluid-filled vibration damping device in the form of the engine mount for a motor vehicle has been described above, the principle of the present invention is also applicable to other types of fluid-filled vibration damping devices for motor vehicles, such as body mounts and differential mounts, and also to various dampers not used for the motor vehicles.

Although the presently preferred embodiments of the invention have been described above in detail for illustrative purpose only, it is to be understood that the invention is not limited to the details of these illustrated embodiments, but may be embodied with various changes, modifications and improvements, which may occur to those skilled in the art, without departing from the spirit and scope of the present invention defined in the following claims:

What is claimed is:

1. A fluid-filled vibration damping device comprising (a) a first and a second mounting member which are spaced apart from each other, (b) an elastic body elastically connecting said first and second mounting members, (c) a fluid chamber which is filled with a non-compressible fluid, and (d) a movable member which partially defines said fluid chamber and which is oscillated to control a pressure of said non-compressible fluid in said fluid chamber for regulating damping characteristics of said vibration damping device, wherein an improvement comprises:

said movable member partially defining a working air-chamber on one of opposite sides thereof which is remote from said fluid chamber, said movable member being oscillated by a periodic change of an air pressure which is applied from an external air pressure source to said working air-chamber, said movable member being supported at an outer peripheral portion thereof by said second mounting member; and a restoring member having an elasticity and supported at an outer peripheral portion thereof by said second mounting member, said restoring member being disposed on at least one of opposite sides of said movable member, said restoring member being fixedly connected at a central portion thereof with a central portion of said movable member, for elastically supporting said movable member, so that a force based on said elasticity of said restoring member acts on said movable member to restore said movable member to an original position thereof during oscillation thereof.

2. A fluid-filled vibration damping device according to claim 1, wherein said restoring member is disposed on one of said opposite sides of said movable member which is remote from said working air-chamber, said restoring member having at least one opening formed therethrough, through which said non-compressible fluid is allowed to flow during said oscillation of said movable member.

3. A fluid-filled vibration damping device according to claim 1, wherein said restoring member has at least one generally spiral slit formed therethrough so as to extend between radially inner and outer portions of said restoring member.

4. A fluid-filled vibration damping device according to claim 1, wherein said fluid chamber includes a primary fluid chamber which is partially defined by said elastic body and said movable member, a pressure of said non-compressible fluid in said primary fluid chamber changing as a result of elastic deformation of said elastic body upon application of a vibrational load between said first and second mounting members.

5. A fluid-filled vibration damping device according to claim 1, wherein said fluid chamber includes a primary and an auxiliary fluid chamber, said primary fluid chamber being partially defined by said elastic body, said auxiliary fluid chamber being partially defined by said movable member, said primary and auxiliary fluid chambers communicating with each other through an orifice, a pressure of said non-compressible fluid in said primary fluid chamber changing as a result of elastic deformation of said elastic body upon application of a vibrational load between said first and second mounting members.

6. A fluid-filled vibration damping device according to claim 1, wherein said restoring member consists of a plate spring.

7. A fluid-filled vibration damping device according to claim 1, wherein said air pressure source includes a vacuum pressure source.

8. A fluid-filled vibration damping device according to claim 1, further comprising a pressure control device connected to said working air-chamber, for changing said air pressure in said working air-chamber in synchronization with a frequency of a vibrational load to be damped by said vibration damping device.

9. A fluid-filled vibration damping device according to claim 8, wherein said pressure control device includes a switch valve for selectively connecting said working air-chamber to said air pressure source and an atmosphere.

10. A fluid-filled vibration damping device comprising (a) a first and a second mounting member which are spaced apart from each other, (b) an elastic body elastically connecting said first and second mounting members, (c) a fluid chamber which is filled with a non-compressible fluid, and (d) a movable member which partially defines said fluid chamber and which is oscillated to control a pressure of said non-compressible fluid in said fluid chamber for regulating damping characteristics of said vibration damping device, wherein an improvement comprises:

said movable member partially defining a working air-chamber on one of opposite sides thereof which is remote from said fluid chamber, said movable member being oscillated by a periodic change of an air pressure which is applied from an external air pressure source to said working air-chamber; and a restoring member disposed on at least one of opposite sides of said movable member for elastically supporting said movable member, such that a force based on an elasticity of said restoring member acts on said movable member to restore said movable member to an original position thereof during oscillation thereof, said restoring member having at least one generally spiral slit formed therethrough so as to extend between radially inner and outer portions of said restoring member.

\* \* \* \* \*